United States Patent
Yan et al.

(10) Patent No.: US 8,655,195 B2
(45) Date of Patent: Feb. 18, 2014

(54) AVERAGE LENGTH MAGNITUDE DETECTING APPARATUS, AND METHOD

(75) Inventors: Weizhen Yan, Beijing (CN); Zhenning Tao, Beijing (CN); Lei Li, Beijing (CN)

(73) Assignee: Fujitsu Limited, Kawasaki (JP)

( * ) Notice: Subject to any disclaimer, the term of this patent is extended or adjusted under 35 U.S.C. 154(b) by 180 days.

(21) Appl. No.: 13/242,732

(22) Filed: Sep. 23, 2011

(65) Prior Publication Data

US 2012/0076491 A1    Mar. 29, 2012

(30) Foreign Application Priority Data

Sep. 27, 2010   (CN) .......................... 2010 1 0297567

(51) Int. Cl.
  *H04B 10/00*   (2013.01)
(52) U.S. Cl.
  USPC ........................................................ 398/211
(58) Field of Classification Search
  USPC ................................................ 398/202–214
  See application file for complete search history.

(56) References Cited

U.S. PATENT DOCUMENTS

| | | | | |
|---|---|---|---|---|
| 7,082,268 | B2 * | 7/2006 | Schemmann et al. | 398/158 |
| 7,596,323 | B1 * | 9/2009 | Price et al. | 398/141 |
| 7,609,979 | B2 * | 10/2009 | Taylor | 398/204 |
| 7,756,421 | B2 * | 7/2010 | Roberts et al. | 398/158 |
| 8,401,403 | B2 * | 3/2013 | Rollins et al. | 398/208 |
| 2011/0194855 | A1 * | 8/2011 | Batshon et al. | 398/65 |
| 2011/0268459 | A1 * | 11/2011 | Rollins et al. | 398/208 |
| 2012/0076491 | A1 * | 3/2012 | Yan et al. | 398/25 |
| 2012/0275797 | A1 * | 11/2012 | Li et al. | 398/152 |

* cited by examiner

*Primary Examiner* — Agustin Bello
(74) *Attorney, Agent, or Firm* — Staas & Halsey LLP

(57) ABSTRACT

The present invention relates to an average length magnitude detecting apparatus and method, and an optical coherent receiver. The average length magnitude detecting method is adopted for detecting whether an average length of an averager used by a polarization crosstalk canceling apparatus in a receiver is long or short, comprising: determining a magnitude of a residual polarization crosstalk coefficient of the receiver; and determining an index that indicates whether the average length of the averager is long or short according to the determined magnitude of the residual polarization crosstalk coefficient.

7 Claims, 16 Drawing Sheets

AVERAGE LENGTH MAGNITUDE DETECTING APPARATUS, AND METHOD

CROSS REFERENCE TO RELATED APPLICATIONS

This application claims the benefit of Chinese Application No. 201010297567.1, filed Sep. 27, 2010, the disclosure of which is incorporated herein by reference.

FIELD OF THE INVENTION

The present invention relates to an optical communication, and particularly, to a cancellation of polarization crosstalk in a coherent optical communication system.

BACKGROUND OF THE INVENTION

With the gradual improvement of the requirement of capacity and flexibility of the optical communication system, the coherent optical communication technology becomes more and more important. In the coherent optical communication, the polarization multiplexing is usually adopted to simultaneously modulate the transmitted signals into two polarization states of the light, so as to multiply the transmission rate under the same bandwidth. At the receiving end, an optical coherent receiver simultaneously receives the signals under two polarization states and converts them into baseband digital signals. The signals under two polarization states are separated through a demultiplexing technology in the digital field, and subsequently, the signals under each polarization state are processed respectively. As can be seen from the above description, whether the signals under two polarization states are well separated has a great influence on the performance of the optical coherent receiver for polarization multiplexing.

In the optical communication system, an equalization and polarization demultiplexer is usually used. The equalization and polarization demultiplexer is implemented by an adaptive filter in general, while the coefficient of the adaptive filter may be adjusted by using constant modular algorithm, minimum mean squared error algorithm, etc. These algorithms all adjust the coefficient of the filter according to the channel state change by using the feedback structure, so that there is no mutual crosstalk between the signals under polarization states H and V.

Existing studies show that when the polarization state change in the channel is at a KHz magnitude, the adaptive filter can track the polarization state change at such magnitude. However, due to various reasons such as the channel nonlinear effect, the polarization state change in the channel may reach a magnitude of signal transmission rate (GHz). Since the current adaptive filter cannot track a polarization state change of such a high rate, crosstalk may occur between the output signals under Polarization states H and V due to residual polarized dispersion (see G. Charlet, et al., "Performance comparison of singly-polarized and polarization multiplexed at 10 Gbaud under nonlinear impairments", OThu8, proceeding of OFC 2008).

For this reason, a method for compensating polarization crosstalk using a Polarization Crosstalk Canceller (PCC) has been proposed (e.g., a literature by Lei Li, OFC2010 paper OWE3). In this literature, the average length is predetermined. But the optimum average length is closely related to the actual condition of the communication system, and the predetermined average length sometimes cannot keep the system performance being in the optimum state.

To be noted, the above introduction to the technical background is just for the convenience of clearly and completely describing the technical solutions of the present invention, and facilitating an appreciation by a person skilled in the art. It shall not be considered that the above technical solutions are known to a person skilled in the art just because they are set forth in the Background section of the present invention.

SUMMARY OF THE INVENTION

In view of the above situation, the present invention is proposed to overcome one or more problems in the prior art, and provide at least one beneficial selection.

According to an aspect of the present invention, an average length magnitude detecting method is provided for detecting whether an average length of an averager used by a polarization crosstalk canceling apparatus in a receiver is long or short, the method comprising: determining a magnitude of a residual polarization crosstalk coefficient of the receiver; and determining an index that indicates whether the average length of the averager is long or short according to the determined magnitude of the residual polarization crosstalk coefficient.

According to another aspect of the present invention, an average length magnitude detecting apparatus is provided for detecting whether an average length of an averager used by a polarization crosstalk canceling apparatus is long or short, the apparatus comprising: a processor that determines a magnitude of a polarization crosstalk coefficient of receiver and determines an index that indicates whether the average length of the averager is long or short according to the determined magnitude of the residual polarization crosstalk coefficient.

Furthermore, the present invention also provides a tangible machine readable storage medium for storing the above computer program.

Features described and/or illustrated with respect to one embodiment can be used in one or more other embodiments in a same or similar way, and/or combine with or replace features in other embodiments.

To be noted, the term "have/having", "include/including" and "comprise/comprising" herein refers to existence of feature, component, step or assembly, not excluding existence or addition of one or more other features, components, steps, assemblies or a combination thereof.

BRIEF DESCRIPTION OF THE DRAWINGS

The above and other objects, features and advantages of the invention will be more apparent in the following descriptions in conjunction with the drawings, in which.

DETAILED DESCRIPTION OF THE PREFERRED EMBODIMENTS

The embodiments of the present invention will be detailedly described as follows in conjunction with the drawings. To be noted, in order to avoid the present invention from being vague due to unnecessary details, the drawings only illustrate device structures and/or processing steps closely related to the solution according to the present invention, while omitting other details not so closely related.

Figure 1:
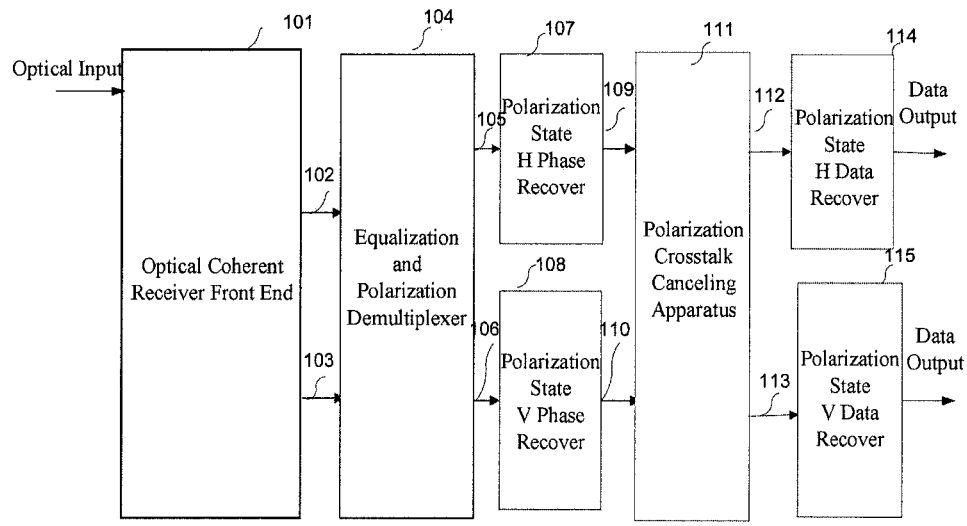
FIG. 1 illustrates a schematic block diagram of an exemplary coherent receiver to which the embodiments of the present invention can apply.

FIG. 1 illustrates a schematic block diagram of an exemplary coherent receiver to which the embodiments of the present invention can apply.

As illustrated in FIG. 1, the exemplary coherent receiver to which the embodiments of the present invention can be applied includes an optical coherent receiver front end 101. The optical coherent receiver front end for example includes a local oscillation laser, a polarization beam splitter, an optical 90° mixer, a photoelectric converter, an analog-to-digital converter (ADC), etc., and it may be implemented by using various structures known to a person skilled in the art. The function of the optical coherent receiver front end is to convert the received polarization multiplexed optical signal into baseband electric signals 102 and 103, and each of them is a mixture of electric signals modulated under two polarization states. Thus the exemplary coherent receiver further comprises an equalization and polarization demultiplexer 104 for equalizing and demultiplexing the baseband electric signals 102 and 103 to separate the signals under two polarization states and obtain signals having no mutual crosstalk, i.e., a signal 105 under polarization state H and a signal 106 under polarization state V as illustrated in FIG. 1. The signal 105 under polarization state H and the signal 106 under polarization state V then undergo a phase recovery made by a polarization state H phase recover 107 and a polarization state V phase recover 108 in the coherent receiver. The phase-recovered signals enter a polarization crosstalk canceling apparatus 111 where the polarization crosstalk is cancelled to obtain signals 112 and 113, which are transmitted to a polarization state H data recover 114 and a polarization state V data recover 115 respectively for a data recovery.

To be noted, the above drawing is just exemplary and is not a limitation to the scope of the present invention. For example, in one embodiment, the coherent receiver may further comprise a frequency difference compensating apparatus for example between the equalization and polarization demultiplexer 104 and a carrier phase recover.

Figure 2:
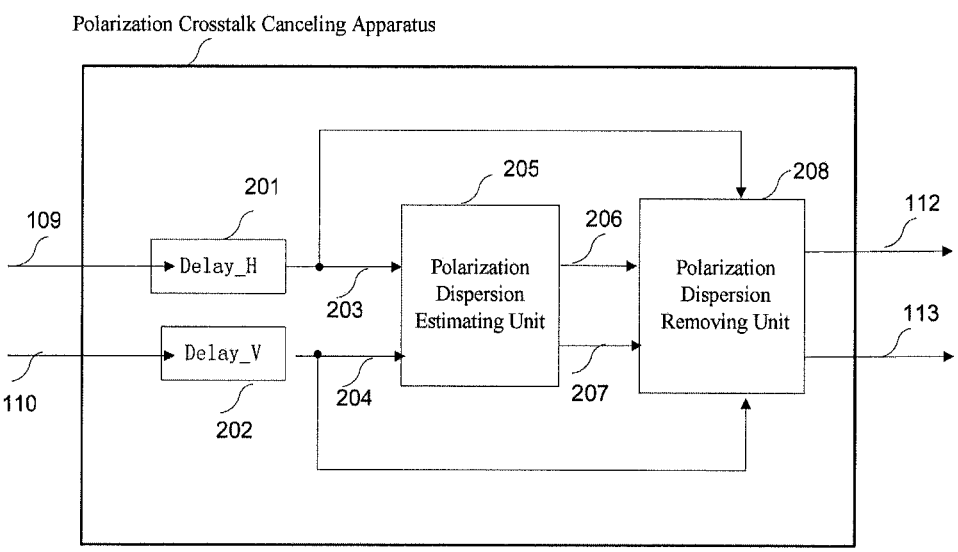
FIG. 2 illustrates an exemplary embodiment of a polarization crosstalk canceling apparatus as illustrated in FIG. 1.

FIG. 2 illustrates an exemplary embodiment of a polarization crosstalk canceling apparatus 111. As illustrated in FIG. 2, phase-recovered signals 109 and 110 under two polarization states are delayed for Delay_H and Delay_V symbols by delay registers 201 and 202, respectively. The purpose of the delay is to keep the relative sequential relationship between the two channels of signals (signals under Polarization states H and V) being consistent with the sequential relationship at the transmitting end. That is, to keep the signals under Polarization states H and V transmitted simultaneously by the transmitter being in the same sequential relationship after a sequence alignment. The values of Delay_H and Delay_V may be obtained from an upper processing module of the receiver, such as a frame processing module. Outputs 203 and 204 (i.e., a signal $R_h$ under polarization state H and a signal $R_v$ under polarization state V) of the delay registers 201 and 202 enter a polarization dispersion estimating unit 205, which will be later described in details with reference to FIG. 3. The polarization dispersion estimating unit 205 estimates polarization dispersion coefficients of the two channels of signals, and outputs them as signals 206 and 207, wherein the signal 206 is the polarization dispersion coefficient of the signal under polarization state V over the signal under polarization state H, and the signal 207 is the polarization dispersion coefficient of the signal under polarization state H over the signal under polarization state V. A Polarization Dispersion removing Unit 208 processes the received signals 206 and 207, so as to realize a polarization dispersion recovery, and output signals 112 and 113 after the polarization dispersion recovery. The polarization state H data recover 114 and the polarization state V data recover 115 perform data recoveries according to the signals 112 and 113 respectively.

Figure 3:
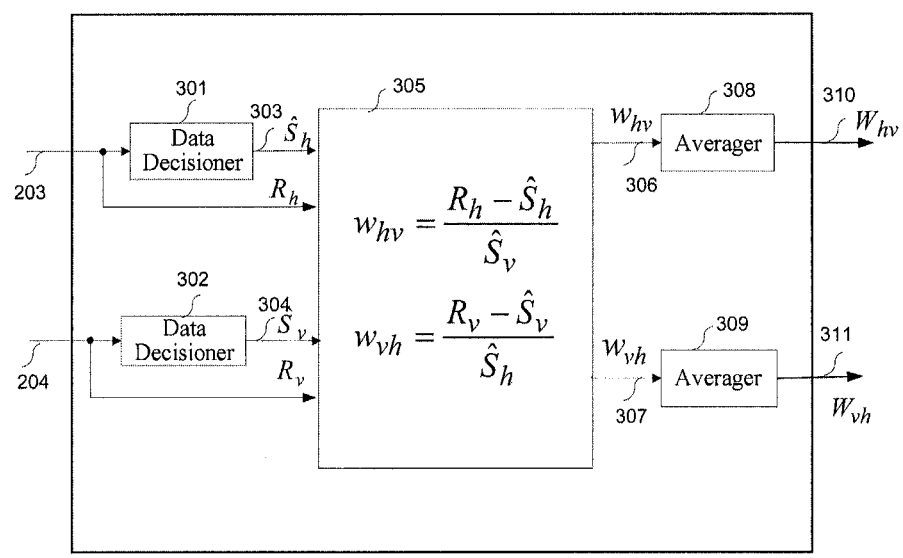
FIG. 3 schematically illustrates a functional block diagram of an exemplary embodiment of a polarization dispersion estimating unit as illustrated in FIG. 2.

FIG. 3 schematically illustrates a functional block diagram of an exemplary embodiment of the polarization dispersion estimating unit as illustrated in FIG. 2. As illustrated in FIG. 3, according to the signals 203 and 204 having undergone a sequence alignment, data decisioner 301 and 302 respectively estimate data 303 and 304 (decided data), i.e., $\hat{S}_h$ and $\hat{S}_v$, which are modulated on the signals under two polarization states. The data decisioner 301 and 302 may perform a data decision using any method known by a person skilled in the art currently and in the future, e.g., soft or hard decision.

The decided data 303 and 304 are input into a polarization dispersion coefficient estimating unit 305 together with the signals 203 and 204. The polarization dispersion coefficient estimating unit 305 calculates polarization dispersion coefficients (i.e. a dispersion coefficient $w_{hv}$ of the signal under polarization state V over the signal under polarization state H, and a dispersion coefficient $w_{vh}$ of the signal under polarization state H over the signal under polarization state V) at each symbol timing according to the signals under two polarization states and the decided data. In the illustrated embodiment, the dispersion coefficients are estimated in the following equations:

$$w_{hv} = \frac{R_h - \hat{S}_h}{\hat{S}_v}$$

$$w_{vh} = \frac{R_v - \hat{S}_v}{\hat{S}_h}$$

$w_{hv}$ and $w_{vh}$ calculated at each symbol timing are output as signals 306 and 307, respectively, and then are averaged by averagers 308 and 309 respectively to eliminate noises and obtain the signals 206 and 207.

Next, the Polarization Dispersion removing Unit 208 cancels polarization dispersion according to the signals 206 and 207, so as to obtain the signals 112 and 113 removed of polarization crosstalk. For example, the Polarization Dispersion removing Unit uses the following equations to cancel the polarization dispersion according to the signals 206 and 207:

$$\begin{bmatrix} S_h \\ S_v \end{bmatrix} = \begin{bmatrix} 1 & w_{hv} \\ w_{vh} & 1 \end{bmatrix}^{-1} \begin{bmatrix} R_h \\ R_v \end{bmatrix}$$
$$= \begin{bmatrix} -1/(-1 + w_{hv} * w_{vh}) & w_{hv}/(-1 + w_{hv} * w_{vh}) \\ w_{vh}/(-1 + w_{hv} * w_{vh}) & -1/(-1 + w_{hv} * w_{vh}) \end{bmatrix} \begin{bmatrix} R_h \\ R_v \end{bmatrix}.$$

The polarization state H data recover 114 and the polarization state V data recover 115 perform data recoveries according to the signals 112 and 113 respectively. The concrete implementation of the data recover may include various current apparatuses, e.g., a hard decision apparatus and an FEC decoder for soft decision.

The above descriptions and illustrations are just exemplary embodiments of the receiver and the polarization crosstalk canceling apparatus to which the embodiments of the present invention can be applied. The structure of the receiver is not limited to a certain specific modulation format, and the receiver may be used in many polarization multiplexing systems, such as DP-mPSK, DP-QAM, m-ary polarization shift keying (mPoISK) and OFDM.

For example refer to PCT/CN2009/074734 "Polarization Dispersion Compensating Apparatus and Polarization Dispersion Compensating Method" filed on Dec. 11, 2009 for other or more detailed embodiments of polarization crosstalk canceling apparatus, and it is incorporated herein by reference. In which, the polarization dispersion compensating apparatus and polarization dispersion compensating method disclose a way for implementing the polarization crosstalk canceling apparatus in the present application. To be noted, the polarization crosstalk canceling apparatus may also be implemented in other ways.

In the polarization crosstalk canceling apparatuses described above and in other embodiments, the average length of the averagers 308 and 309 are predetermined.

Figure 4:
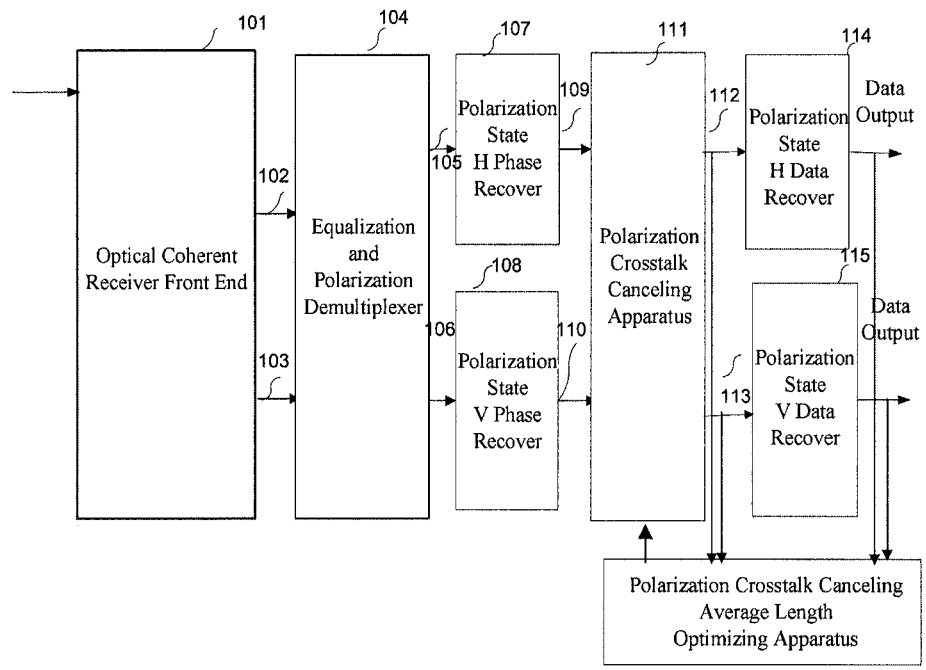
FIG. 4 illustrates a schematic block diagram of a coherent receiver using a polarization crosstalk canceling average length optimizing apparatus according to an embodiment of the present invention.

FIG. 4 illustrates a schematic block diagram of a coherent receiver using a polarization crosstalk canceling average length optimizing apparatus according to an embodiment of the present invention.

As illustrated in FIG. 4, the polarization crosstalk canceling average length optimizing apparatus according to an embodiment of the invention adjusts the average length of the averager of the polarization crosstalk canceling apparatus 111 by using the output signals 112 and 113 (indicated as R'h and R'v respectively) and the outputs S'h and S'v of the data recovers. The polarization crosstalk canceling apparatus 111, the polarization state H data recover 114, the polarization state H data recover 115, the polarization crosstalk canceling average length optimizing apparatus can be comprised by a processor such as a digital signal processor (DSP).

Figure 5:
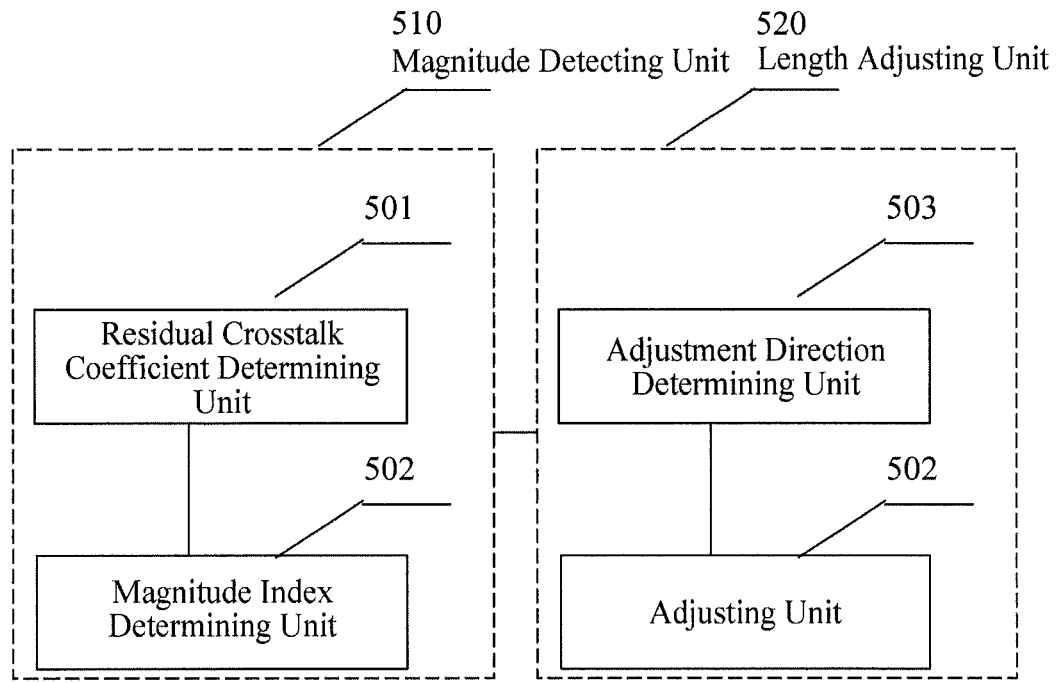
FIG. 5 illustrates a schematic block diagram of a polarization crosstalk canceling average length optimizing apparatus according to an embodiment of the invention.

FIG. 5 illustrates a schematic block diagram of a polarization crosstalk canceling average length optimizing apparatus 500 according to an embodiment of the present invention. As illustrated in FIG. 5, according to an embodiment of the present invention, the polarization crosstalk canceling average length optimizing apparatus includes a magnitude detecting unit 510 and a length adjusting unit 520. The magnitude detecting unit 510 is configured to provide an index (i.e., a magnitude index) that indicates whether the average length of an averager of the polarization crosstalk canceling apparatus is long or short, or shall be lengthened or shortened. According to an embodiment of the present invention, the magnitude detecting unit 510 includes a residual crosstalk coefficient determining unit 501 and a magnitude index determining unit 502. The residual crosstalk coefficient determining unit 501 determines a residual crosstalk coefficient according to the output from the polarization crosstalk canceling apparatus 111 and the output from the data recovers 114 and 115. The magnitude index determining unit 502 determines a magnitude index according to the magnitude of the residual crosstalk coefficient determined by the residual crosstalk coefficient determining unit 501. The length adjusting unit 520 adjusts the average length of the averager of the polarization crosstalk canceling apparatus according to the index determined by the magnitude detecting unit 510, and may include an adjustment direction determining unit 503 and an adjusting unit 504.

Figure 6:
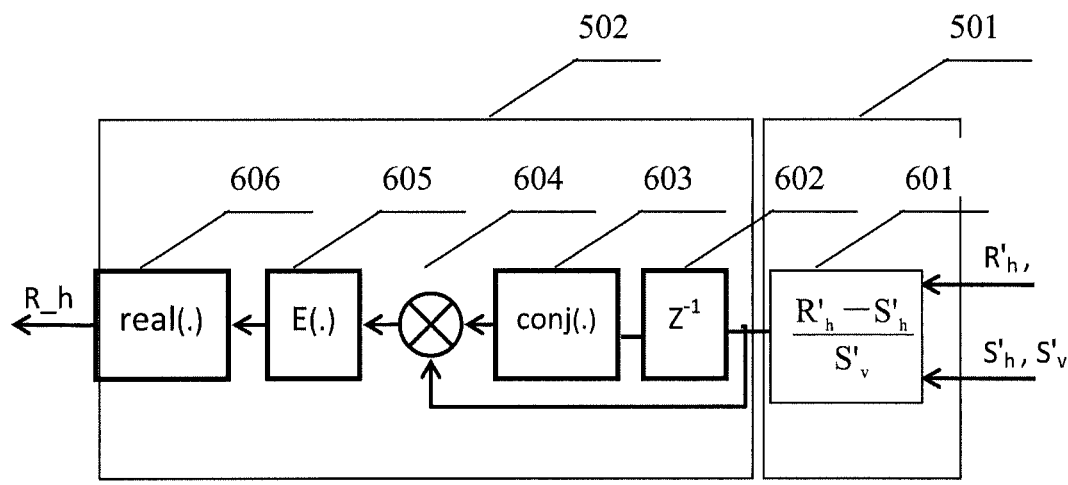
FIG. 6 illustrates a block diagram of a magnitude detecting unit according to a first embodiment.

FIG. 6 illustrates a block diagram of a magnitude detecting unit 510 according to a first embodiment. As illustrated in FIG. 6, in the magnitude detecting unit according to the first embodiment of the present invention, the residual crosstalk coefficient determining unit 501 is implemented by an h-branch residual crosstalk coefficient calculating unit 601 that calculates a residual crosstalk coefficient of h-branch, while the magnitude index determining unit 502 includes a delaying unit 602, a conjugating unit 603, a multiplying unit 604, an averaging unit 605 and a real part taking unit 606. The residual crosstalk coefficient of h-branch is the dispersion coefficient of the signal under polarization state V over the signal under polarization state H in the receiver.

The h-branch residual crosstalk coefficient calculating unit 601 may calculate the residual crosstalk coefficient of h-branch according to equation $$\frac{R'_h - S'_h}{S'_v}.$$

The delaying unit 602 delays the residual crosstalk coefficient of h-branch calculated by the h-branch residual crosstalk coefficient calculating unit 601. Although just one symbol is delayed in the illustrated embodiment, it is not a limitation to the present invention, and several symbols may be delayed upon demand, which is suitable to all delayers described in the present application. The conjugating unit 603 acquires a conjugate of the signals delayed by the delaying unit 602. The multiplying unit 604 multiplies the output from the h-branch residual crosstalk coefficient calculating unit 601 and the conjugate acquired by the conjugating unit 603. The averaging unit 605 averages the result of the multiplying from the multiplying unit 604. The averaging unit 605 for example may be implemented by the filter. Finally the real part taking unit 606 takes a real part of the signal output from the averaging unit 605, so as to obtain a magnitude index R_h based on the h-branch residual crosstalk coefficient.

Figure 7:
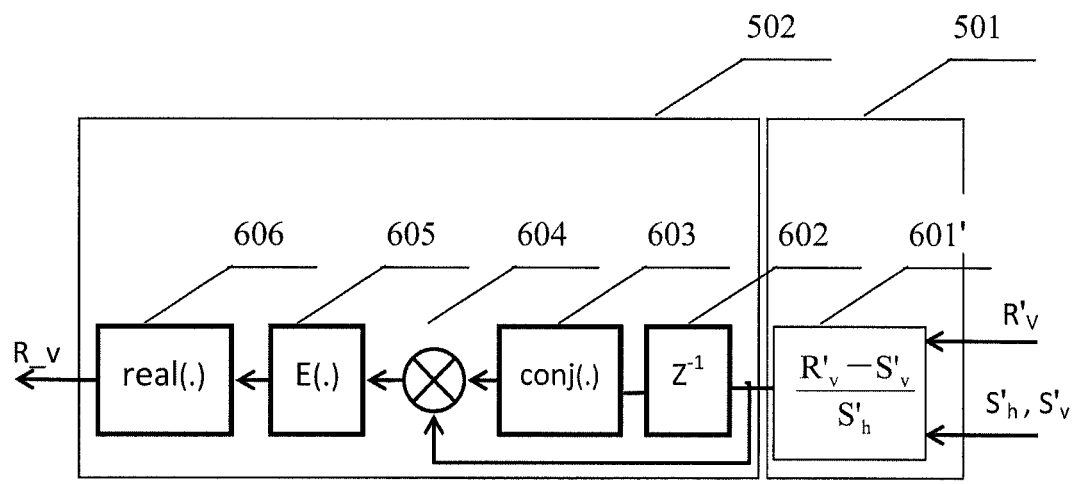
FIG. 7 illustrates a block diagram of a magnitude detecting unit according to a second embodiment.

FIG. 7 illustrates a block diagram of a magnitude detecting unit 510 according to a second embodiment. As compared with FIGS. 6-7, in the magnitude detecting unit 510 according to the second embodiment, the residual crosstalk coefficient determining unit 501 is implemented by a v-branch residual crosstalk coefficient calculating unit 601' that calculates a residual crosstalk coefficient of v-branch, and the v-branch residual crosstalk coefficient calculating unit 601' may calculate the residual crosstalk coefficient of v-branch according to equation $$\frac{R'_v - S'_v}{S'_h}.$$

The residual crosstalk coefficient of v-branch is the dispersion coefficient of the signal under polarization state H over the signal under polarization state V in the receiver.

The magnitude index determining unit 502 may be implemented in the same way as the magnitude index determining unit 502 according to the first embodiment as illustrated in FIG. 6, but the used signal is output from the v-branch residual crosstalk coefficient calculating unit 601' and not from the h-branch residual crosstalk coefficient calculating unit 601. For the purpose of conciseness, the magnitude index determining unit 502 of the magnitude detecting unit 510 in the second embodiment is no longer described.

The magnitude index determined by the magnitude detecting unit 510 in the second embodiment is R_v based on the v-branch residual crosstalk coefficient.

Figure 8:
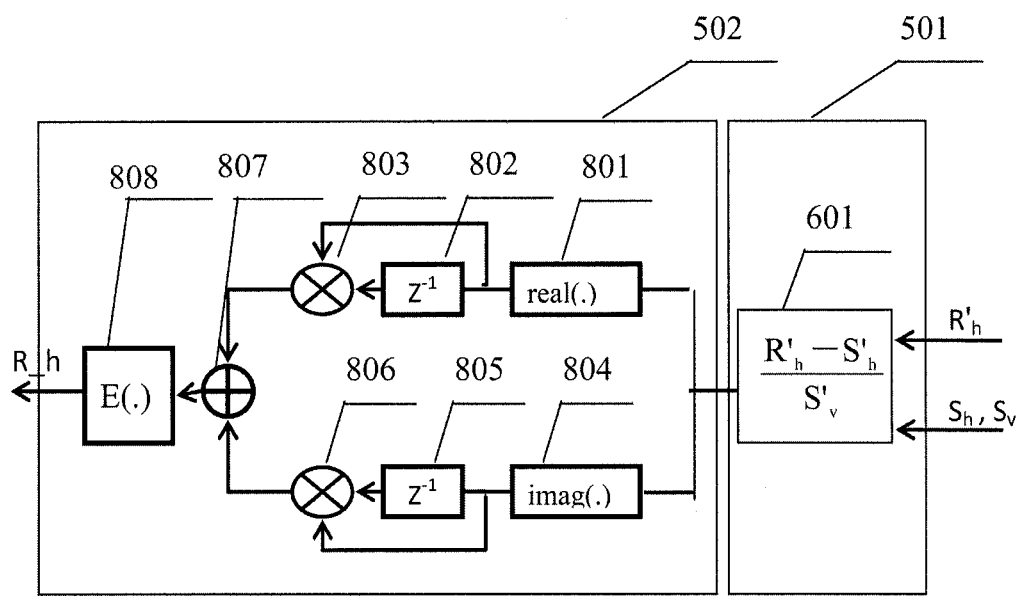
FIG. 8 illustrates a block diagram of a magnitude detecting unit according to a third embodiment.

FIG. 8 illustrates a block diagram of a magnitude detecting unit 510 according to a third embodiment. As illustrated in FIG. 8, in the magnitude detecting unit according to the third embodiment of the present invention, the residual crosstalk coefficient determining unit 501 is implemented by an h-branch residual crosstalk coefficient calculating unit 601 that calculates a residual crosstalk coefficient of h-branch, and the h-branch residual crosstalk coefficient calculating unit 601 may calculate the residual crosstalk coefficient of h-branch according to equation $$\frac{R'_h - S'_h}{S'_v}.$$

The magnitude index determining unit 502 includes a real part branch, an imaginary part branch, an adding unit and an averaging unit. The real part branch includes a real part taking unit 801, a delaying unit 802 and a multiplying unit 803. The real part taking unit 801 computes a real part of a signal output from the h-branch residual crosstalk coefficient calculating unit 601, the delaying unit 802 delays the real part output from the real part taking unit 801, and the multiplying unit 803 multiplies an output from the real part taking unit 801 and an output from the delaying unit 802.

An imaginary part taking unit 804 computes an imaginary part of a signal output from the h-branch residual crosstalk coefficient calculating unit 601, a delaying unit 805 to delays the imaginary part output from the imaginary part taking unit 804, and a multiplying unit 806 multiplies an output from the imaginary part taking unit 804 and an output from the delaying unit 805.

An adding unit 807 adds the output from the real part circuit (i.e., the output from the multiplying unit 803) and the output from the imaginary part circuit (i.e., the output from is the multiplying unit 806). An averaging unit 808 averages the result of adding by the adding unit 807 to obtain a magnitude index R_h. The averaging unit 808 for example may be implemented by a filter.

Figure 9:
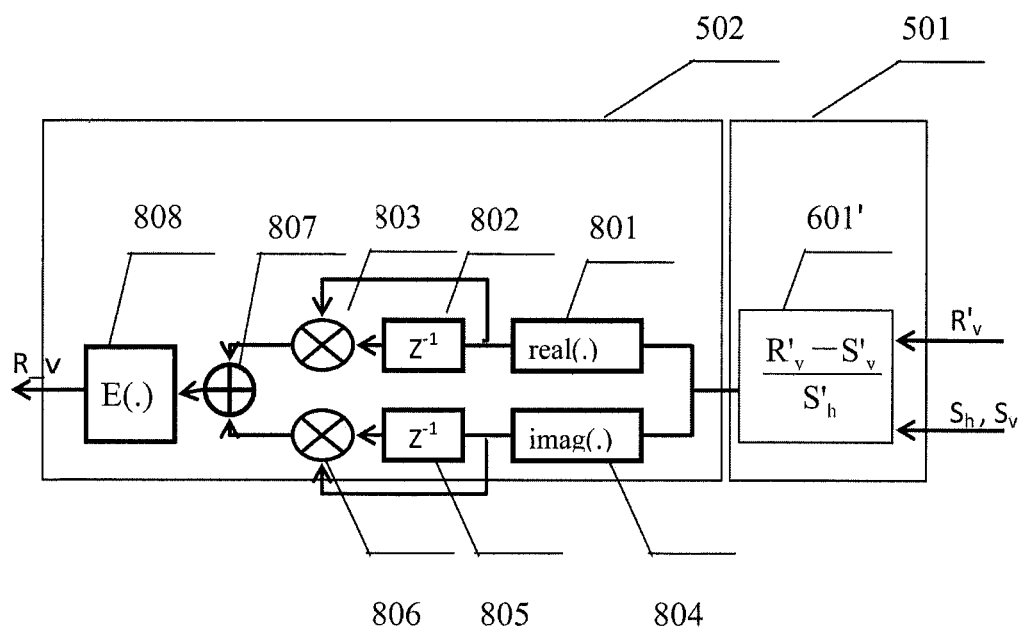
FIG. 9 illustrates a block diagram of a magnitude detecting unit according to a fourth embodiment.

FIG. 9 illustrates a block diagram of a magnitude detecting unit 510 according to a fourth embodiment. As compared with FIGS. 8-9, in the magnitude detecting unit 510 according to the fourth embodiment, the residual crosstalk coefficient determining unit 501 is implemented by a v-branch residual crosstalk coefficient calculating unit 601 that calculates a residual crosstalk coefficient of v-branch, and the v-branch residual crosstalk coefficient calculating unit 601' may calculate the residual crosstalk coefficient of v-branch according to equation $$\frac{R'_v - S'_v}{S'_h}.$$

The magnitude index determining unit 502 may be implemented in the same way as the magnitude index determining unit 502 according to the third embodiment as illustrated in FIG. 8, but the used signal is output from the v-branch residual crosstalk coefficient calculating unit 601' and not from the h-branch residual crosstalk coefficient calculating unit 601. For the purpose of conciseness, the magnitude index determining unit 502 of the magnitude detecting unit 510 according to the fourth embodiment is no longer described.

The magnitude index determined by the magnitude detecting unit 510 according to the fourth embodiment is R_v.

Figure 10:
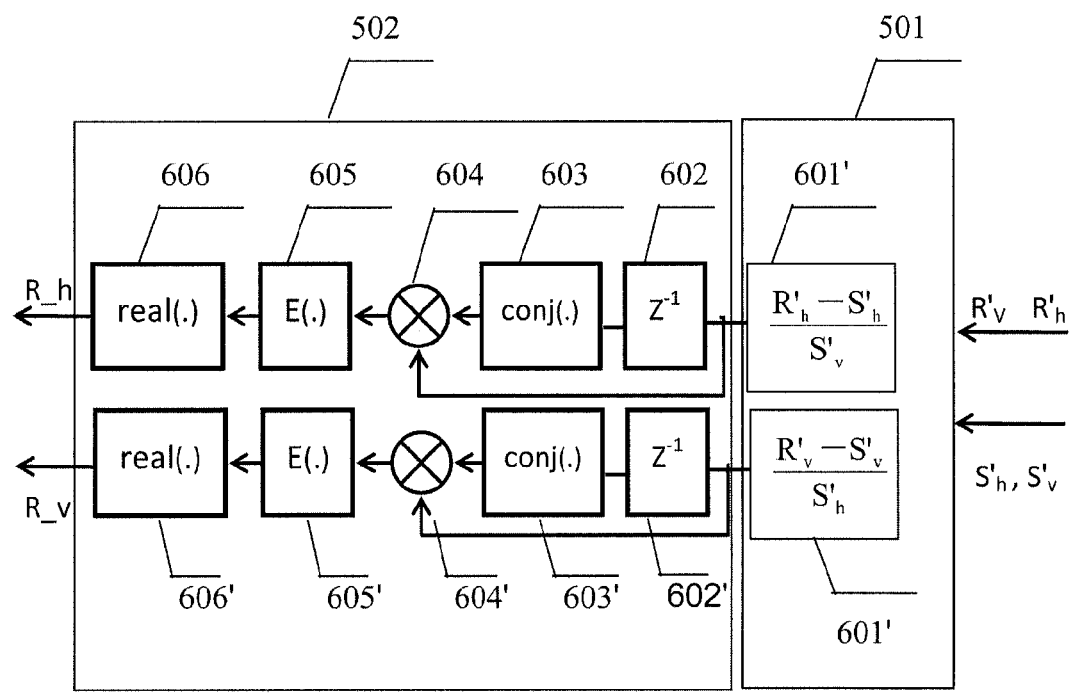
FIG. 10 illustrates a block diagram of a magnitude detecting unit according to a fifth embodiment.

FIG. 10 illustrates a block diagram of a magnitude detecting unit 510 according to a fifth embodiment. As illustrated in FIG. 10, in the magnitude detecting unit according to the fifth embodiment of the present invention, the residual crosstalk coefficient determining unit 501 is implemented by an h-branch residual crosstalk coefficient calculating unit 601 that calculates a residual crosstalk coefficient of h-branch and a v-branch residual crosstalk coefficient calculating unit 601' that calculates a residual crosstalk coefficient of v-branch, wherein the h-branch residual crosstalk coefficient calculating unit 601 may calculate the residual crosstalk coefficient of h-branch according to equation $$\frac{R'_h - S'_h}{S'_v},$$

and the v-branch residual crosstalk coefficient calculating unit 601' may calculate the residual crosstalk coefficient of v-branch according to equation $$\frac{R'_v - S'_v}{S'_h}.$$

In the magnitude detecting unit according to the fifth embodiment of the present invention, the magnitude index determining unit 502 includes two branches having the same structure and corresponding to the residual crosstalk coefficients of branches h and v, respectively; they are implemented in the same way as described with reference to FIG. 6, and herein are not repeated. To be noted, for the purpose of distinguishing, reference signs of elements in the branch corresponding to the residual crosstalk coefficient of v-branch are added with a symbol """, but their functions are still the same as those of the elements described with reference to FIG. 6.

Figure 11:
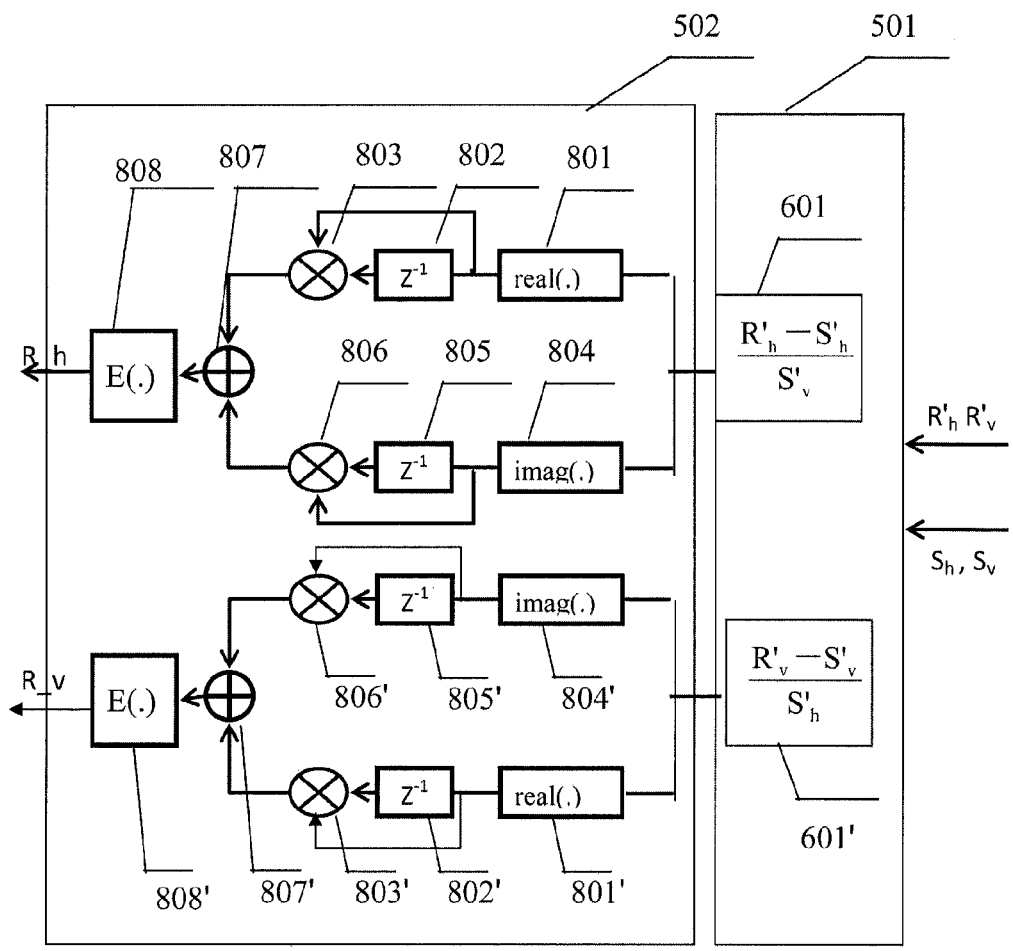
FIG. 11 illustrates a block diagram of a magnitude detecting unit according to a sixth embodiment.

FIG. 11 illustrates a block diagram of a magnitude detecting unit 510 according to a sixth embodiment. As illustrated in FIG. 11, in the magnitude detecting unit according to the sixth embodiment of the present invention, the residual crosstalk coefficient determining unit 501 is implemented by an h-branch residual crosstalk coefficient calculating unit 601 that calculates a residual crosstalk coefficient of h-branch and a v-branch residual crosstalk coefficient calculating unit 601' that calculates a residual crosstalk coefficient of v-branch, wherein the h-branch residual crosstalk coefficient calculating unit 601 may calculate the residual crosstalk coefficient of h-branch according to equation $$\frac{R'_h - S'_h}{S'_v},$$

and the v-branch residual crosstalk coefficient calculating unit 601' may calculate the residual crosstalk coefficient of v-branch according to equation $$\frac{R'_v - S'_v}{S'_h}.$$

In the magnitude detecting unit according to the sixth embodiment of the present invention, the magnitude index determining unit 502 includes two branches having the same structure and corresponding to the residual crosstalk coefficients of branches h and v, respectively; they are implemented in the same way as described with reference to FIG. 8, and herein are not repeated. To be noted, for the purpose of distinguishing, reference signs of elements in the branch corresponding to the residual crosstalk coefficient of v-branch are added with a symbol """, but their functions are still the same as those of the elements described with reference to FIG. 8.

Figure 12:
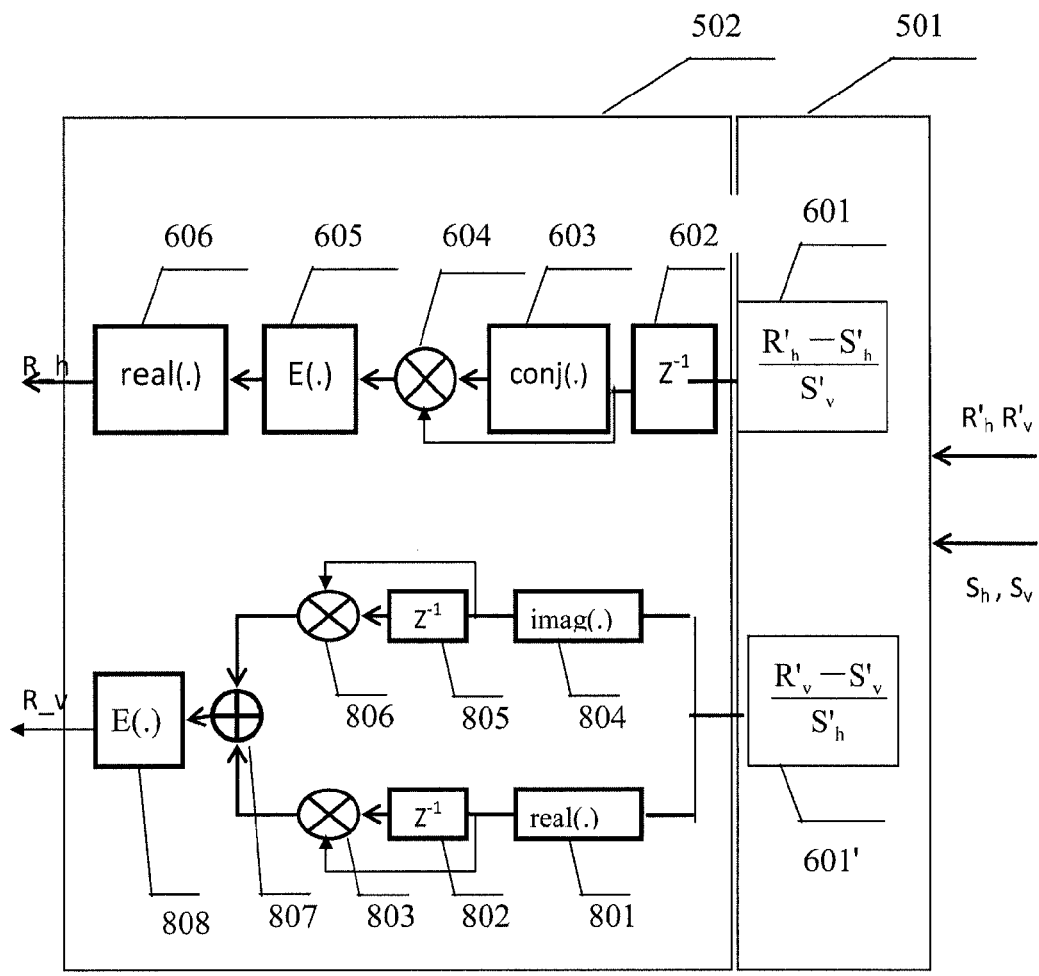
FIG. 12 illustrates a block diagram of a magnitude detecting unit according to a seventh embodiment.

FIG. 12 illustrates a block diagram of a magnitude detecting unit 510 according to a seventh embodiment. As illustrated in FIG. 12, in the magnitude detecting unit according to the seventh embodiment of the present invention, the residual crosstalk coefficient determining unit 501 is implemented by an h-branch residual crosstalk coefficient calculating unit 601 that calculates a residual crosstalk coefficient of h-branch and a v-branch residual crosstalk coefficient calculating unit 601' that calculates a residual crosstalk coefficient of v-branch, wherein the h-branch residual crosstalk coefficient calculating unit 601 may calculate the residual crosstalk coefficient of h-branch according to equation $$\frac{R'_h - S'_h}{S'_v},$$

and the v-branch residual crosstalk coefficient calculating unit 601' may calculate the residual crosstalk coefficient of v-branch according to equation $$\frac{R'_v - S'_v}{S'_h}.$$

In the magnitude detecting unit according to the seventh embodiment of the present invention, the magnitude index determining unit 502 includes two branches corresponding to the residual crosstalk coefficients of branches h and v, respectively; the structure corresponding to the residual crosstalk coefficient of h-branch is implemented in the same way as described with reference to FIG. 6, and the structure corresponding to the residual crosstalk coefficient of v-branch is implemented in the same way as described with reference to FIG. 8, and herein are not repeated.

Figure 13:
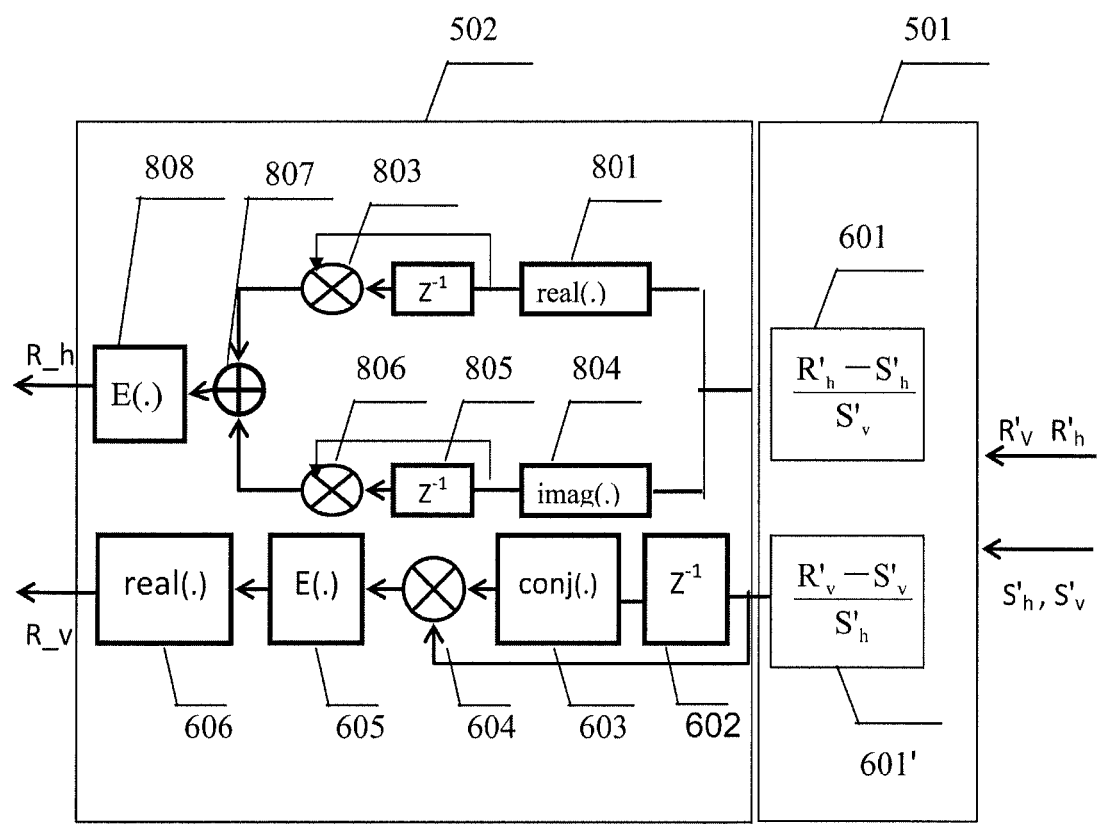
FIG. 13 illustrates a block diagram of a magnitude detecting unit according to an eighth embodiment.

FIG. 13 illustrates a block diagram of a magnitude detecting unit 510 according to an eighth embodiment. As illustrated in FIG. 13, in the magnitude detecting unit according to the eighth embodiment of the present invention, the residual crosstalk coefficient determining unit 501 is implemented by an h-branch residual crosstalk coefficient calculating unit 601 that calculates a residual crosstalk coefficient of h-branch and a v-branch residual crosstalk coefficient calculating unit 601' that calculates a residual crosstalk coefficient of v-branch, wherein the h-branch residual crosstalk coefficient calculating unit 601 may calculate the residual crosstalk coefficient of h-branch according to equation $$\frac{R'_h - S'_h}{S'_v},$$

and the v-branch residual crosstalk coefficient calculating unit 601' may calculate the residual crosstalk coefficient of v-branch according to equation $$\frac{R'_v - S'_v}{S'_h}.$$

In the magnitude detecting unit according to the eighth embodiment of the present invention, the magnitude index determining unit 502 includes two branches corresponding to the residual crosstalk coefficients of branches h and v, respectively; the structure corresponding to the residual crosstalk coefficient of h-branch is implemented in the same way as described with reference to FIG. 8, and the structure corresponding to the residual crosstalk coefficient of v-branch is implemented in the same way as described with reference to FIG. 6, and herein are not repeated.

Figure 14:
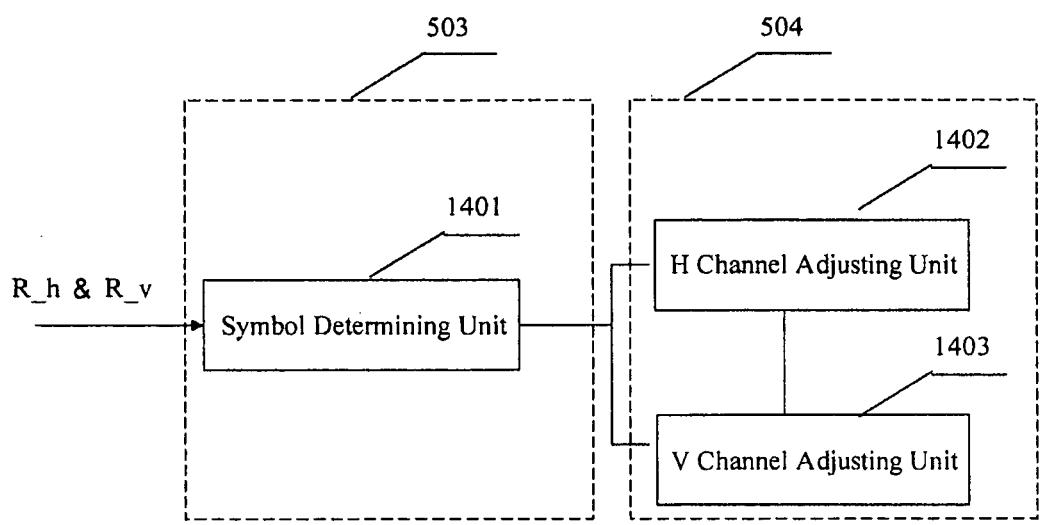
FIG. 14 illustrates a length adjusting unit according to an embodiment.

FIG. 14 illustrates a length adjusting unit 520 according to an embodiment. As illustrated in FIG. 14, an adjustment direction determining unit 503 is composed of a symbol determining unit 1401, and an adjusting unit 504 is composed of an H channel adjusting unit 1402 and a V channel adjusting unit 1403. With respect to the magnitude detecting unit 510 as illustrated in the embodiments of FIGS. 6-9 (i.e., the condition under which only one index is output), the symbol determining unit 1401 computes a symbol of the index output from the magnitude detecting unit 510. The H channel adjusting unit 1402 and the V channel adjusting unit 1403 adjust the average lengths of the H channel averager and the V channel averager according to the symbol, respectively. Under such condition, the average length of the averager of the polarization crosstalk canceling apparatus may be decreased in case the symbol is positive, increased in case the symbol is negative, and maintained in case the symbol is 0.

Figure 15:
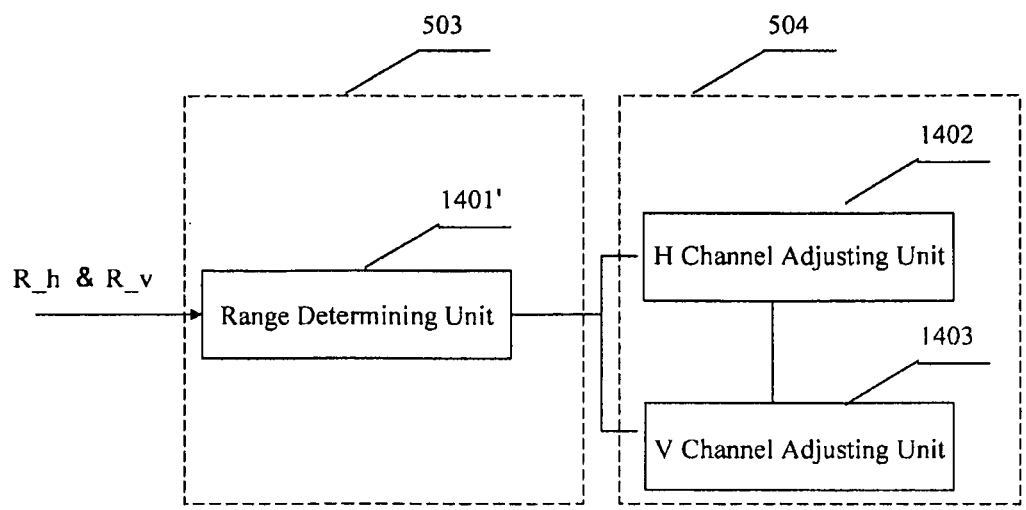
FIG. 15 illustrates a length adjusting unit according to another embodiment.

FIG. 15 illustrates a length adjusting unit 520 according to another embodiment. As illustrated in FIG. 15, an adjustment direction determining unit 503 is composed of a range determining unit 1401', and an adjusting unit 504 is composed of an H channel adjusting unit 1402 and a V channel adjusting unit 1403. With respect to the magnitude detecting unit 510 as illustrated in the embodiments of FIGS. 6-9 (i.e., the condition under which only one index is output), the range determining unit 1401' computes an interval where the index output from the magnitude detecting unit 510 is located. The H channel adjusting unit 1402 and the V channel adjusting unit 1403 adjust the average lengths of the H channel averager and the V channel averager according to the determined result, respectively. Under such condition, range determining unit 1401' for example firstly determines a value of the index output from the magnitude detecting unit 510, and then judges whether the value is larger than a predetermined positive number $\alpha$, or less than $-\alpha$, or between $\alpha$ and $-\alpha$.

The H channel adjusting unit 1402 and the V channel adjusting unit 1403 decrease the average length of the averager in case the value is larger than $\alpha$, while maintain the average length of the averager in case the value is between $\alpha$ and $-\alpha$, and increase the average length of the averager in case the value is less than $-\alpha$. The symbol determining unit 1401 or the range determining unit 1401' is corresponding to the embodiment of the direction indicating unit according to the present invention.

Figure 16:
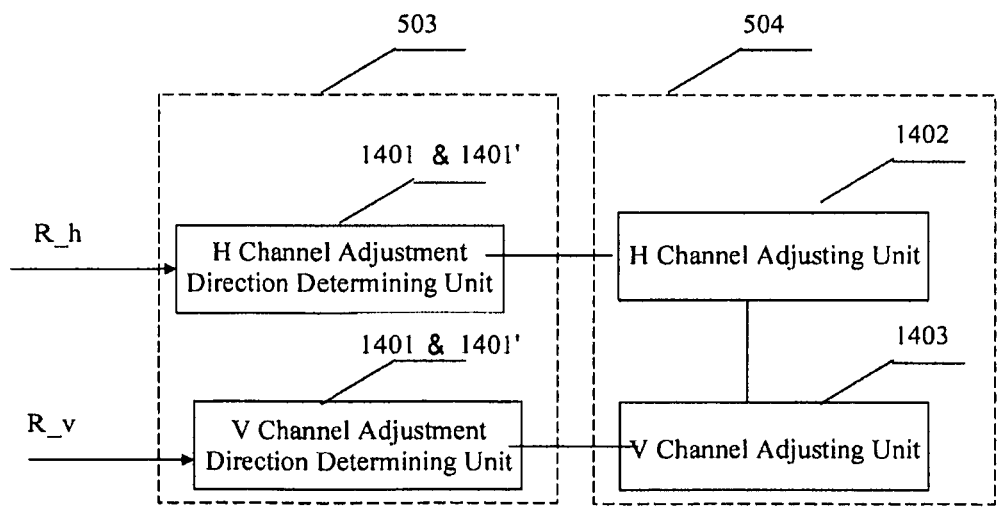
FIG. 16 illustrates a length adjusting unit according to another embodiment.

FIG. 16 illustrates a length adjusting unit 520 according to another embodiment. As illustrated in FIG. 16, an adjustment direction determining unit 503 is composed of an H channel adjustment direction determining unit and a V channel adjustment direction determining unit, and an adjusting unit 504 is composed of an H channel adjusting unit 1402 and a V channel adjusting unit 1403. The H channel adjustment direction determining unit and the V channel adjustment direction determining unit may be formed by a symbol determining unit 1401 or a range determining unit 1401', respectively. With respect to the magnitude detecting unit 510 as illustrated in the embodiments of FIGS. 10-13 (i.e., the condition under which two indexes are output), the H channel adjusting unit 1402 and the V channel adjusting unit 1403 output, for corresponding index, a symbol of the index or information indicating an interval where the index is located. The H channel adjusting unit 1402 and the V channel adjusting unit 1403 adjust the average lengths of the H channel averager and the V channel averager according to the determined result (the symbol or information indicating the located interval) respectively.

Preferably, the H channel adjustment direction determining unit and the V channel adjustment direction determining unit are composed of the same unit, i.e., the symbol determining unit 1401 or the range determining unit 1401'. However, the H channel adjustment direction determining unit may be formed by the symbol determining unit 1401 while the V channel adjustment direction determining unit may be formed by the range determining unit 1401', or the H channel adjustment direction determining unit may be formed by the range determining unit 1401' while the V channel adjustment direction determining unit may be formed by the symbol determining unit 1401.

Figure 17:
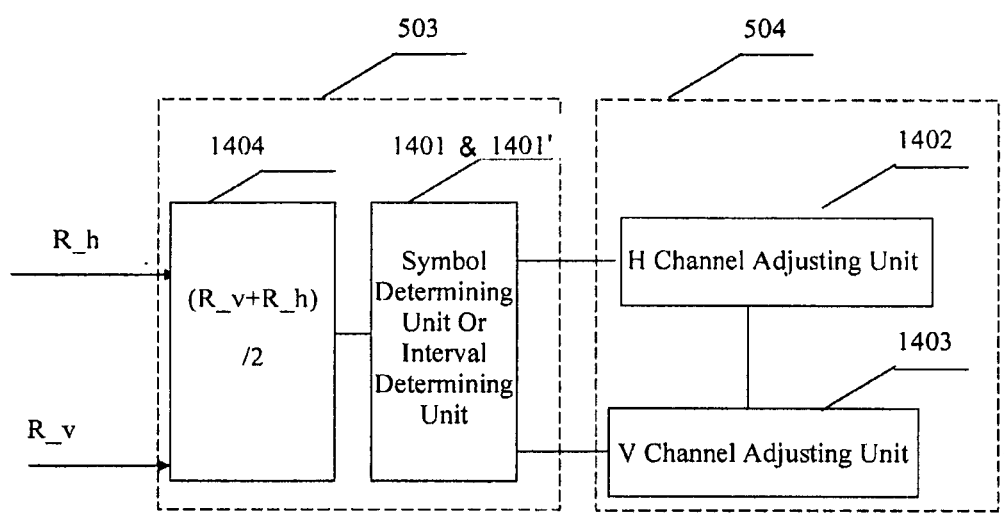
FIG. 17 illustrates a length adjusting unit according to another embodiment.

FIG. 17 illustrates a length adjusting unit 520 according to another embodiment. As illustrated in FIG. 17, an adjustment direction determining unit 503 is composed of an average value calculating unit 1404 and a symbol determining unit 1401 (or a range determining unit 1401'). With respect to the magnitude detecting unit 510 as illustrated in the embodiments of FIGS. 10-13 (i.e., the condition under which two indexes are output), the average value calculating unit 1404 calculates an average value of the two indexes, and the symbol determining unit 1401 (or the range determining unit 1401') determines a symbol of the average value (or determines an located interval). The H channel adjusting unit 1402 and the V channel adjusting unit 1403 adjust the average lengths of the H channel averager and the V channel averager according to the determined result (the symbol or information indicating the located interval) respectively.

To be noted, although the magnitude detecting unit 510 and the length adjusting unit 520 are described separately in the above embodiment, they may be partially or wholly integrated together. For example, the adjustment direction determining unit 503 may be integrated in the magnitude detecting unit 510. In that case, the value of the adjustment direction determining unit 503 is actually an index that indicates the magnitude of the average length of the averager. The case where the adjustment direction determining unit 503 is integrated is also an embodiment of the magnitude detecting unit 510.

In addition, although the magnitude detecting unit and the length adjusting unit are used together in the above descriptions, they can be used separately. For example, the magnitude detecting unit (including the case where the magnitude detecting unit has the adjustment direction determining unit) may be connected to a displaying apparatus and/or storing apparatus, so as to notify the magnitude of the average length of the averager to the user or designer for further analysis and processing, for future use, etc. That is to say, the service range of the magnitude detecting unit is not limited to the use in conjunction with the length adjusting unit. The displaying apparatus for example may be various displays well known in the art such as LCD display, cold cathode ray tube display, LED display, etc. The storing apparatus may be various storing devices such as hard disk, optical disk, soft disk, magneto-optical disk, etc.

Figure 18:
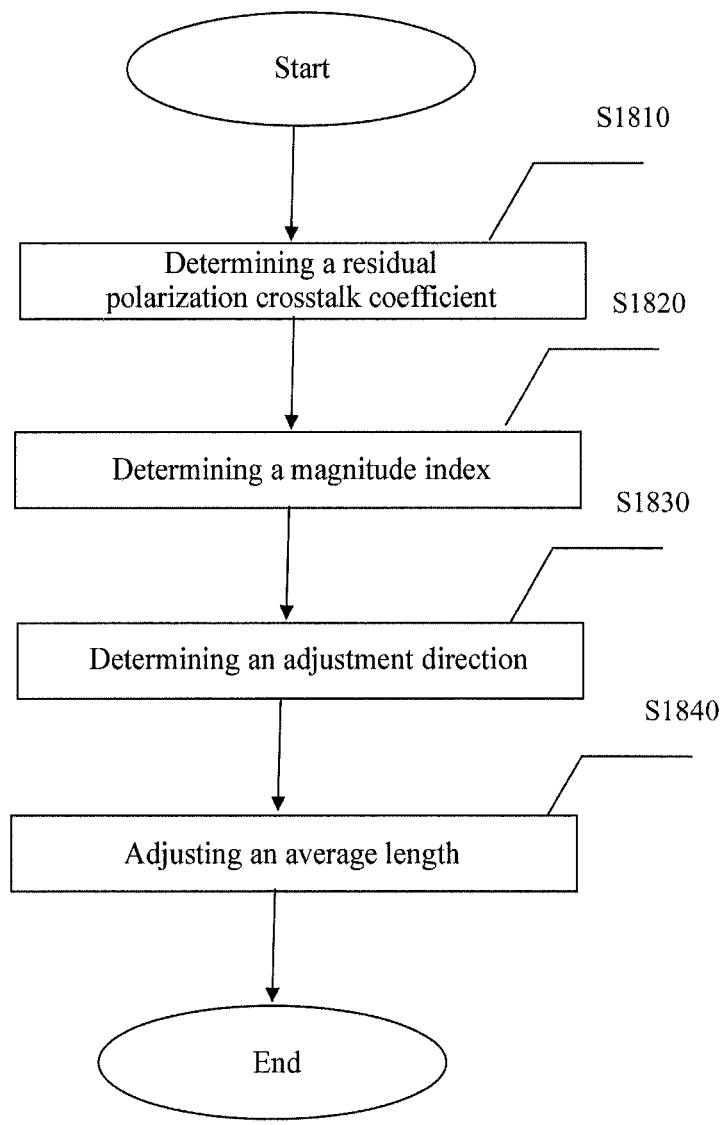
FIG. 18 illustrates a schematic flowchart of a polarization crosstalk canceling average length magnitude detecting method according to an embodiment of the present invention and a polarization crosstalk canceling average length optimizing method using the same.

FIG. 18 illustrates a schematic flowchart of a polarization crosstalk canceling average length magnitude detecting method according to an embodiment of the present invention and a polarization crosstalk canceling average length optimizing method using the same. As illustrated in FIG. 18, firstly a crosstalk coefficient is determined in step S1810. This step for example may be performed by the aforementioned residual crosstalk coefficient determining unit 501. In this step, a residual crosstalk coefficient of h-branch or a residual crosstalk coefficient of v-branch can be determined (e.g., as illustrated in FIGS. 6-9), or both of them can be determined (e.g., as illustrated in FIGS. 10-13). In step S1820, an index that indicates the magnitude of an average length of an averager is determined for the crosstalk coefficient determined in step S1810. In this step, as described about the magnitude index determining unit 502, the magnitude index may be determined using various methods, e.g., for the determined crosstalk coefficient, the magnitude index may be determined by steps of delaying, conjugating, multiplying, averaging, taking a real part, etc. (e.g., see FIG. 6 and the description thereof). Or a real part branch and an imaginary part branch may be used to delay and multiply the real part and imaginary part of the crosstalk coefficient, respectively, and then the results of the two branches are added to calculate an average value (e.g., see FIG. 8 and the description thereof). In step S1830, an adjustment direction is determined. The to adjustment direction may be determined by acquiring a symbol or a value range of the magnitude index determined in step S1820. In case two magnitude indexes are determined in step S1820, an average value of the values of the two indexes may be calculated firstly, and then a symbol or range of the average value is acquired, so as to determine an adjustment direction (e.g., see FIGS. 14-17 and the description thereof). In step S1840, an adjustment is carried out according to the adjustment direction determined in step S1830.

The steps of the method as illustrated in FIG. 18 may be appreciated with reference to the descriptions of the apparatuses as illustrated in FIGS. 5-17, and herein are not repeated for the purpose of conciseness.

Figure 19:
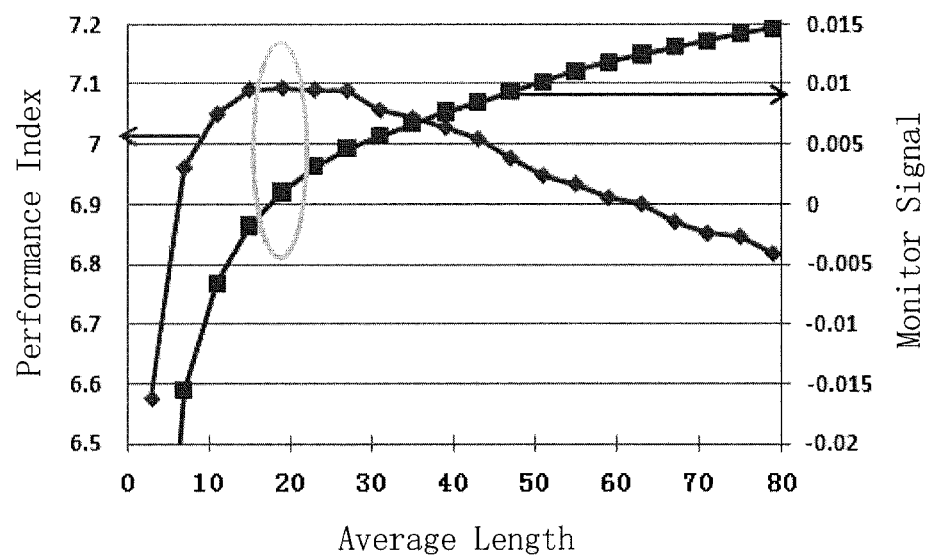
FIG. 19 illustrates the conditions of experimental verification of the apparatuses and methods of the present invention.

FIG. 19 illustrates the conditions of experimental verification of the apparatuses and methods of the present invention. In FIG. 19, the left vertical axis represents a measurement of the performance index, the right vertical axis represents the monitor signal obtained by the apparatus and method of the present invention, while the horizontal axis represents the average length of the averager; the line formed by connecting the boxes is a relationship curve between the monitor signal obtained by the apparatus and method of the present invention and the average length, while the line formed by connecting the lozenges is a relationship curve between the performance index and the average length. As illustrated in FIG. 19, the average length corresponding to a zero value (or a near value) of the monitor signal (e.g., R_h, R_v or (R_h+R_v)/2) is corresponding to the optimum performance. That is to say, the zero point (or a near value) of the monitor signal provides an optimum average length.

To be noted, in some alternative embodiments, functions/actions of the described blocks may occur in a sequence other than that shown in the block diagram or flowchart. For example, according to the concerned functions/actions, two blocks consecutively shown actually can be performed concurrently or those blocks sometimes may be performed in a reverse sequence. In addition, the functions of a given block in the flowchart and/or block diagram may be separated into several blocks, and/or the functions of two or more blocks in the flowchart and/or block diagram may be at least partially integrated.

Excursuses

The embodiments of the present invention provide the following technical solutions:

Excursus 1. An average length magnitude detecting apparatus for detecting whether an average length of an averager used by a polarization crosstalk canceling apparatus in a receiver is long or short, the apparatus comprising:

a residual polarization crosstalk coefficient magnitude determining unit for determining a magnitude of a residual polarization crosstalk coefficient of the receiver; and a magnitude index acquiring unit for determining an index that indicates whether the average length of the averager is long or short according to the determined magnitude of the residual polarization crosstalk coefficient.

Excursus 2. The apparatus according to excursus 1, wherein, the residual polarization crosstalk coefficient magnitude determining unit determines a magnitude of residual polarization crosstalk coefficient from V-branch signals to H-branch signals, or a magnitude of residual polarization crosstalk coefficient from H-branch signals to V-branch signals, the magnitude index acquiring unit uses one of the following two structures to determine the index:

Structure 1
the magnitude index acquiring unit comprising:
a delaying unit for delaying the residual polarization crosstalk coefficient by one or more symbols;
a conjugating unit for conjugating the delayed signals;
a multiplying unit for multiplying the residual polarization crosstalk coefficient and the conjugated signals;
an averaging unit for averaging results of the multiplying;
a real part taking unit for computing real parts of the averaged signals, Structure 2
the magnitude index acquiring unit comprising:
a real part taking unit for computing real part of the residual polarization crosstalk coefficient;
an imaginary part taking unit for computing imaginary part of the residual polarization crosstalk coefficient;
a first delaying unit for delaying the real part by one or more symbols;
a second delaying unit for delaying the imaginary part by one or more symbols;
a first multiplying unit for multiplying the delayed real part and the un-delayed real part to acquire results of multiplying the real parts;
a second multiplying unit for multiplying the delayed imaginary part and the un-delayed imaginary part to acquire results of multiplying the imaginary parts;
an adding unit for adding the results of multiplying the imaginary parts and the results of multiplying the real parts; and
an averaging unit for averaging results of the adding.

3. The apparatus according to excursus 1, wherein, the residual polarization crosstalk coefficient magnitude determining unit determines both a magnitude of residual polarization crosstalk coefficient from V-branch signals to H-branch signals, and a magnitude of residual polarization crosstalk coefficient from H-branch signals to V-branch signals, wherein the magnitude index acquiring unit determines, by using one of the following two structures, an index for H-branch according to the magnitude of residual polarization crosstalk coefficient from V-branch signals to H-branch signals and an index for V-branch according to the magnitude of residual polarization crosstalk coefficient from H-branch signals to V-branch signals; or determines, by using the following two solutions respectively, the index for H-branch according to the magnitude of residual polarization crosstalk coefficient from V-branch signals to H-branch signals, and the index for V-branch according to the magnitude of residual polarization crosstalk coefficient from H-branch signals to V-branch signals:

Structure 1
the magnitude index acquiring unit comprising:
a delaying unit for delaying the residual polarization crosstalk coefficient by one or more symbols;
a conjugating unit for conjugating the delayed signals;
a multiplying unit for multiplying the residual polarization crosstalk coefficient and the conjugated signals;
an averaging unit for averaging results of the multiplying;
a real part taking unit for computing real parts of the averaged signals, Structure 2
the magnitude index acquiring unit comprising:
a real part taking unit for computing real part of the residual polarization crosstalk coefficient;
an imaginary part taking unit for computing imaginary part of the residual polarization crosstalk coefficient;

a first delaying unit for delaying the real part by one or more symbols;

a second delaying unit for delaying the imaginary part by one or more symbols;

a first multiplying unit for multiplying the delayed real part and the un-delayed real part to acquire results of multiplying the real parts;

a second multiplying unit for multiplying the delayed imaginary part and the un-delayed imaginary part to acquire results of multiplying the imaginary parts;

an adding unit for adding the results of multiplying the imaginary parts and the results of multiplying the real parts; and an averaging unit for averaging results of the adding.

Excursus 4. The apparatus according to excursus 2, further comprising a direction indicating unit for acquiring a symbol of the index or a signal indicating a range of the index.

Excursus 5. The apparatus according to excursus 3, further comprising:

a meaning unit for acquiring an average value of the index for V-branch and the index for H-branch; and a direction indicating unit acquiring a symbol of the average value or a signal indicating a range of the average value.

Excursus 6. The apparatus according to excursus 3, further comprising:

a first direction indicating unit for acquiring a symbol of the index for H-branch or a signal indicating a range of the index for H-branch; and a second direction indicating unit for acquiring a symbol of the index for V-branch or a signal indicating a range of the index for V-branch.

Excursus 7. The apparatus according to excursus 1, wherein the polarization crosstalk canceling apparatus is connected to a data recovering apparatus, the residual polarization crosstalk coefficient magnitude determining unit determines the magnitude of residual polarization crosstalk coefficient according to outputs of the polarization crosstalk canceling apparatus and the data recovering apparatus.

Excursus 8. An average length magnitude detecting method for detecting whether an average length of an averager used by a polarization crosstalk canceling apparatus in a receiver is long or short, the method comprising:

determining a magnitude of a residual polarization crosstalk coefficient of the receiver; and determining an index that indicates whether the average length of the averager is long or short according to the determined magnitude of the residual polarization crosstalk coefficient.

Excursus 9. The method according to excursus 8, wherein the processing of determining the magnitude of the residual polarization crosstalk coefficient of the receiver determines a magnitude of residual polarization crosstalk coefficient from V-branch signals to H-branch signals, or a magnitude of residual polarization crosstalk coefficient from H-branch signals to V-branch signals, the processing of determining the index uses one of the following two solutions to determine the index:

Solution 1 delaying the residual polarization crosstalk coefficient by one or more symbols;

conjugating the delayed signals;

multiplying the residual polarization crosstalk coefficient and the conjugated signals;

averaging results of the multiplying;

computing real parts of the averaged signals,

Solution 2 computing real part and imaginary part of the residual polarization crosstalk coefficient;

delaying the real part and the imaginary part by one or more symbols, respectively;

multiplying the delayed imaginary part and the un-delayed imaginary part to acquire results of multiplying the imaginary parts;

multiplying the delayed real part and the un-delayed real part to acquire results of multiplying the real parts;

adding the results of multiplying the imaginary parts and the results of multiplying the real parts; and averaging results of the adding.

Excursus 10. The method according to excursus 8, wherein the processing of determining the magnitude of the residual polarization crosstalk coefficient of the receiver determines both a magnitude of residual polarization crosstalk coefficient from V-branch signals to H-branch signals, and a magnitude of residual polarization crosstalk coefficient from H-branch signals to V-branch signals, wherein the processing of determining the index determines, by using one of the following two solutions, an index for H-branch according to the magnitude of residual polarization crosstalk coefficient from V-branch signals to H-branch signals and an index for V-branch according to the magnitude of residual polarization crosstalk coefficient from H-branch signals to V-branch signals; or determines, by using the following two solutions respectively, the index for H-branch according to the magnitude of residual polarization crosstalk coefficient from V-branch signals to H-branch signals, and the index for V-branch according to the magnitude of residual polarization crosstalk coefficient from H-branch signals to V-branch signals:

Solution 1:

delaying the crosstalk coefficient by one or more symbols;

conjugating the delayed signals;

multiplying the crosstalk coefficient and the conjugated signals;

averaging results of the multiplying;

computing real parts of the averaged signals,

Solution 2:

computing real part and imaginary part of the crosstalk coefficient;

delaying the real part and the imaginary part by one or more symbols, respectively;

multiplying the delayed imaginary part and the un-delayed imaginary part to acquire results of multiplying the imaginary parts;

multiplying the delayed real part and the un-delayed real part to acquire results of multiplying the real parts;

adding the results of multiplying the imaginary parts and the results of multiplying the real parts; and averaging results of the adding.

Excursus 11. The method according to excursus 9, further comprising acquiring a symbol of the index or a signal indicating a range of the index.

Excursus 12. The method according to excursus 10, further comprising:

acquiring an average value of the index for V-branch and the index for H-branch; and acquiring a symbol of the average value or a signal indicating a range of the average value.

Excursus 13. The method according to excursus 10, further comprising:

acquiring a symbol of the index for H-branch or a signal indicating a range of the index for H-branch; and acquiring a symbol of the index for V-branch or a signal indicating a range of the index for V-branch.

Excursus 14. The method according to excursus 8, wherein the polarization crosstalk canceling apparatus is connected to a data recovering apparatus, the processing of determining the magnitude of the residual polarization crosstalk coefficient determines the magnitude of coefficient for residual polarization crosstalk according to outputs of the polarization crosstalk canceling apparatus and the data recovering apparatus.

Excursus 15. An optical coherent receiver comprising a polarization crosstalk canceling apparatus and a data recovering apparatus, wherein the optical coherent receiver further comprising the average length magnitude detecting apparatus of any of excursuses 1-8.

Excursus 16. The optical coherent receiver according to excursus 15, further comprising a length adjusting unit that adjusts the average length of the averager used by the polarization crosstalk canceling apparatus according to the index acquired by the average length magnitude detecting apparatus.

Although the present invention is described through the examples of the preferred embodiments, it shall be appreciated that, various other modifications, changes and additions may be made within the spirit and range of the present invention. Therefore, the claims are accompanied to cover all those modifications, changes and additions falling within the spirit and range of the present invention.

What is claimed is:

1. An apparatus for detecting average length magnitude comprising:

a processor, configured to determine a magnitude of a residual polarization crosstalk coefficient of the receiver, and determines an index that indicates whether the average length of the averager is long or short according to the determined magnitude of the residual polarization crosstalk coefficient;

wherein, the apparatus is configured to detect whether an average length of an averager used by a polarization crosstalk canceling apparatus in a receiver is long or short and the processor uses one of the following two solutions to determine the index:

solution 1 the processor delays the residual polarization crosstalk coefficient by one or more symbols, conjugates the delayed signals, multiplies the coefficient for residual polarization crosstalk and the conjugated signals, averages results of the multiplying, and calculates real parts of the averaged signals, solution 2 the processor calculates real part of the coefficient for residual polarization crosstalk, calculates imaginary part of the coefficient for residual polarization crosstalk, delays the real part by one or more symbols, delays the imaginary part by one or more symbols, multiplies the delayed real part and the un-delayed real part to acquire results of multiplying the real parts, multiplies the delayed imaginary part and the un-delayed imaginary part to acquire results of multiplying the imaginary parts, adds the results of multiplying the imaginary parts and the results of multiplying the real parts, and averages results of the adding.

2. The apparatus according to claim 1, wherein, the processor is configured to determine a magnitude of coefficient for residual polarization crosstalk from V-branch signals to H-branch signals, or a magnitude of coefficient for residual polarization crosstalk from H-branch signals to V-branch signals.

3. The apparatus according to claim 1, wherein the processor is configured to determine both a magnitude of coefficient for residual polarization crosstalk from V-branch signals to H-branch signals, and a magnitude of coefficient for residual polarization crosstalk from H-branch signals to V-branch signals, the processor is configured to determine, by using one of the two solutions, an index for H-branch according to the magnitude of coefficient for residual polarization crosstalk from V-branch signals to H-branch signals and an index for V-branch according to the magnitude of coefficient for residual polarization crosstalk from H-branch signals to V-branch signals; or determine, by using the two solutions respectively, the index for H-branch according to the magnitude of coefficient for residual polarization crosstalk from V-branch signals to H-branch signals, and the index for V-branch according to the magnitude of coefficient for residual polarization crosstalk from H-branch signals to V-branch signals.

4. The apparatus according to claim 2, wherein the processor is configured to acquire a symbol of the index or a signal indicating a range of the index.

5. The apparatus according to claim 3, wherein the processor is configured to acquire an average value of the index for V-branch and the index for H-branch, and acquire a symbol of the average value or a signal indicating a range of the average value.

6. The apparatus according to claim 3, wherein the processor is configured to acquire a symbol of the index for H-branch or a signal indicating a range of the index for H-branch, and acquire a symbol of the index for V-branch or a signal indicating a range of the index for V-branch.

7. An average length magnitude detecting method for detecting whether an average length of an averager used by a polarization crosstalk canceling apparatus in a receiver is long or short, the method comprising:

determining a magnitude of a residual polarization crosstalk coefficient of the receiver; and determining an index that indicates whether the average length of the averager is long or short according to the determined magnitude of the residual polarization crosstalk coefficient;

wherein, the step of determining the index uses one of the following two solutions to determine the index:

solution 1 delaying the residual polarization crosstalk coefficient by one or more symbols;

conjugating the delayed signals;

multiplying the coefficient for residual polarization crosstalk and the conjugated signals;

averaging results of the multiplying; and calculating real parts of the averaged signals, solution 2 calculating real part of the coefficient for residual polarization crosstalk;

calculating imaginary part of the coefficient for residual polarization crosstalk;

delaying the real part by one or more symbols;

delaying the imaginary part by one or more symbols;

multiplying the delayed real part and the un-delayed real part to acquire results of multiplying the real parts;

multiplying the delayed imaginary part and the un-delayed imaginary part to acquire results of multiplying the imaginary parts;

adding the results of multiplying the imaginary parts and the results of multiplying the real parts; and averaging results of the adding.

\* \* \* \* \*